United States Patent
Goumballa et al.

(10) Patent No.: US 10,648,870 B2
(45) Date of Patent: May 12, 2020

(54) TEMPERATURE SENSOR AND CALIBRATION METHOD THEREOF HAVING HIGH ACCURACY

(71) Applicant: NXP USA, Inc., Austin, TX (US)

(72) Inventors: Birama Goumballa, Larra (FR); Didier Salle, Toulouse (FR); Olivier Doare, La Salvetat St Gilles (FR); Cristian Pavao Moreira, Frouzins (FR)

(73) Assignee: NXP USA, Inc., Austin, TX (US)

( * ) Notice: Subject to any disclaimer, the term of this patent is extended or adjusted under 35 U.S.C. 154(b) by 316 days.

(21) Appl. No.: 15/464,145

(22) Filed: Mar. 20, 2017

(65) Prior Publication Data

US 2017/0307451 A1    Oct. 26, 2017

(30) Foreign Application Priority Data

Apr. 22, 2016   (EP) .................................. 16290072

(51) Int. Cl.
| | |
|---|---|
| *G01K 15/00* | (2006.01) |
| *G01K 7/01* | (2006.01) |
| *G01K 7/16* | (2006.01) |
| *G05F 3/26* | (2006.01) |

(52) U.S. Cl.
CPC ............. *G01K 15/005* (2013.01); *G01K 7/01* (2013.01); *G01K 7/16* (2013.01); *G05F 3/267* (2013.01)

(58) Field of Classification Search
CPC ........ G01K 7/01; G01K 22/15; G01K 15/005; G01K 2219/00; G01K 7/14; G01K 7/24; G05F 3/245; G05F 1/10; G05F 1/468; G05F 3/16; G05F 3/225; G05F 3/247; G05F 3/262; G05F 1/56

USPC ..................... 327/512, 513; 702/99
See application file for complete search history.

(56) References Cited

U.S. PATENT DOCUMENTS

| | | | |
|---|---|---|---|
| 5,519,354 A | 5/1996 | Audy | |
| 5,604,427 A * | 2/1997 | Kimura | .................... G05F 3/30 |
| | | | 323/313 |
| 5,982,221 A | 11/1999 | Tuthill | |
| 6,078,208 A | 6/2000 | Nolan | |
| 6,137,341 A | 10/2000 | Friedman et al. | |
| 6,181,191 B1 * | 1/2001 | Paschal | .................. G05F 3/245 |
| | | | 327/513 |

(Continued)

FOREIGN PATENT DOCUMENTS

| | | |
|---|---|---|
| WO | 2015012798 A1 | 1/2015 |
| WO | 2015084410 A1 | 6/2015 |

OTHER PUBLICATIONS

Meijer, Gerard C. M., "A Low Power Easy to Calibrate Temperature Sensor," IEEE Journal of Solid-State Circuits, vol. SC-17, No. 3, Jun. 1982, 5 pages.

(Continued)

*Primary Examiner* — Gail Kaplan Verbitsky

(57) ABSTRACT

Disclosed is a temperature sensor including a first current generator configured to generate a proportional to absolute temperature (PTAT) current, a second current generator configured to generate an inverse PTAT (IPTAT) current, the PTAT current and IPTAT current being combined to form a reference current having a sensitivity relative to temperature, a plurality of current mirrors to adjust the sensitivity and gain of the reference current, and a variable resistor to set an output calibration voltage based on the generated current.

15 Claims, 3 Drawing Sheets

(56) References Cited

U.S. PATENT DOCUMENTS

| | | | |
|---|---|---|---|
| 6,335,661 | B1 | 1/2002 | Furman |
| 7,127,368 | B2* | 10/2006 | Choi ................. G01K 7/01 |
| | | | 702/130 |
| 7,439,601 | B2 | 10/2008 | Hartley |
| 7,486,129 | B2* | 2/2009 | Pietri ................. G05F 3/245 |
| | | | 327/539 |
| 7,581,882 | B2* | 9/2009 | Noguchi ............. G01K 7/01 |
| | | | 327/539 |
| 7,728,575 | B1* | 6/2010 | Ozalevli .............. G05F 3/30 |
| | | | 323/313 |
| 7,808,068 | B2 | 10/2010 | Hartley |
| 7,809,519 | B2* | 10/2010 | Sinha ................. G01K 7/015 |
| | | | 702/99 |
| 8,134,414 | B2* | 3/2012 | McCorquodale ...... H03B 5/04 |
| | | | 331/117 FE |
| 8,140,293 | B2* | 3/2012 | Jeong ................. G01K 7/425 |
| | | | 702/117 |
| 8,167,485 | B2* | 5/2012 | Lin ................... G01K 7/015 |
| | | | 327/512 |
| 8,378,735 | B2 | 2/2013 | Pereira Da Silva, Jr. et al. |
| 8,415,940 | B2 | 4/2013 | Yin et al. |
| 8,540,423 | B2 | 9/2013 | Liu |
| 8,988,137 | B2* | 3/2015 | Furusawa ............ G05F 3/30 |
| | | | 327/539 |
| 9,004,754 | B2* | 4/2015 | Swei ................. G01K 7/01 |
| | | | 327/513 |
| 9,240,775 | B2* | 1/2016 | Eberlein ............. G01K 7/01 |
| 9,535,446 | B2* | 1/2017 | Glibbery ............. G05F 3/30 |
| 9,909,934 | B2* | 3/2018 | Camarena ........... G01K 15/005 |
| 10,190,922 | B2* | 1/2019 | Eberlein ............. G01K 7/01 |
| 2006/0197585 | A1* | 9/2006 | Kim ................. G05F 3/245 |
| | | | 327/539 |
| 2008/0297229 | A1* | 12/2008 | Ramamoorthy ...... G05F 1/567 |
| | | | 327/513 |
| 2011/0001546 | A1* | 1/2011 | Guo ................. G01K 3/005 |
| | | | 327/512 |
| 2011/0038396 | A1* | 2/2011 | Yi ................... G01K 7/01 |
| | | | 374/171 |
| 2011/0057718 | A1* | 3/2011 | Snoeij ................. H03F 1/30 |
| | | | 327/512 |
| 2013/0083825 | A1* | 4/2013 | Zhang ................ G01K 7/01 |
| | | | 374/178 |
| 2013/0272341 | A1 | 10/2013 | Lee et al. |
| 2014/0104005 | A1* | 4/2014 | Zhang ............... H03K 3/0315 |
| | | | 331/17 |
| 2014/0269834 | A1* | 9/2014 | Eberlein ............. G01K 7/01 |
| | | | 374/178 |
| 2016/0047696 | A1 | 2/2016 | Ramaraju et al. |
| 2016/0209861 | A1* | 7/2016 | Choi ................. G05F 3/267 |
| 2016/0238464 | A1* | 8/2016 | Eberlein ............. G01K 7/01 |
| 2017/0074924 | A1* | 3/2017 | Lu .................. H01L 23/34 |
| 2018/0157285 | A1* | 6/2018 | Hanson .............. G06F 1/08 |
| 2018/0183442 | A1* | 6/2018 | Pavao Moreira ...... H03L 1/02 |
| 2018/0209854 | A1* | 7/2018 | Feldman ............. G01K 13/002 |
| 2018/0328792 | A1* | 11/2018 | Zhu .................. G01K 7/34 |
| 2019/0131863 | A1* | 5/2019 | El Markhi ........... H02M 3/1563 |

OTHER PUBLICATIONS

Meijer, Gerard C. M., "Integrated Circuits and Components for Bandgap References and Temperature Transducers," Electronics Research Laboratory, Dissertation Delft, Mar. 18, 1982, 78 pages.

Meijer, Gerard C. M., "An IC Temperature Transducer with an Intrinsic Reference," IEEE Journal of Solid-State Circuits, vol. SC-15, No. 3, Jun. 1980, 4 pages.

Banba et al., "A CMOS Bandgap Reference Circuit with Sub-1-V Operation," IEEE Journal of Solid-State Circuits, vol. 34, No. 5, May 1999, 5 pages.

Leung et al., "A Sub-1-V 15-ppm/° C. CMOS Bandgap Voltage Reference Without Requiring Low Threshold Voltage Device," IEEE Journal of Solid-State Circuits, vol. 37, No. 4, Apr. 2002, 5 pages.

Zhu et al., "A Novel Low Voltage Subtracting BandGap Reference with Temperature Coefficient of 2.2 ppm/° C.," IEEE, 2011, 4 pages.

Texas Instruments, "LM34 Precision Fahrenheit Temperature Sensors," SNIS161D, Mar. 2000, Revised Jan. 2016, 27 pages.

Texas Instruments, "LM35 Precision Centigrade Temperature Sensors," SNIS 159G, Aug. 1999, Revised Aug. 2016, 31 pages.

European Search Report, Application No. 16290072.4.

* cited by examiner

TEMPERATURE SENSOR AND CALIBRATION METHOD THEREOF HAVING HIGH ACCURACY

CROSS-REFERENCE TO RELATED APPLICATIONS

This application claims priority under 35 U.S.C. § 119 to European patent application no. EP16290072.4, filed Apr. 22, 2016, the contents of which are incorporated by reference herein.

TECHNICAL FIELD

Embodiments described herein relate to circuits and methods to calibrate a temperature sensor.

BACKGROUND

In the design of electronic circuits for various applications, thermal monitoring is used, and can be critical for semiconductor components such as integrated circuits to avoid higher temperatures that could negatively affect various circuit components. Temperature monitoring may be used for a variety of applications such as radar, which can carry operating temperatures in a range of −40° to 150° Celsius. Integrated temperature sensors often use an architecture based on diodes and use ΔVBE (delta base-emitter voltage) measurements between a pair of bipolar junction transistors to define a voltage that is proportional to absolute temperature (PTAT).

To obtain good accuracy, prior art designs can require large calibration algorithms using at least two or three temperature insertion points to calibrate a temperature sensor. To increase the dynamic range on ΔVBE in technology areas such as radar applications, higher numbers of diodes are used which can lead to complexity of circuits and inaccuracy of a temperature sensor. When using a high number of diodes, mismatch modeling is difficult and not very accurate.

Examples of circuitry where temperature monitoring is used include an all-digital phase locked loop (ADPLL) having components such as a time to digital converter (TDC) or digital controlled oscillator (DCO) that may exhibit some drift in temperature during use. This drift may give rise to parametric issues including drift or spurs at the output. Early detection of possible overheating can prevent system malfunctioning such as parameter degradation and irreversible damage. Effective and accurate temperature sensor calibration may be used to ensure early detection.

In previous circuit designs, to achieve a good accuracy, very large calibration algorithms have been required using at least two, three, or more temperature insertion points.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments described herein include a temperature sensor, including a first current generator configured to generate a proportional to absolute temperature (PTAT) current, a second current generator configured to generate an inverse PTAT (IPTAT) current, the PTAT current and IPTAT current being combined to form a reference current having a sensitivity relative to temperature, a plurality of current mirrors to adjust the sensitivity and gain of the reference current, and a variable resistor to set an output calibration voltage based on the generated current.

A digital controller may be configured to control adjustment of the current slope. The variable resistor may be controlled by the digital controller. The plurality of current mirrors may include a plurality of MOS transistors. The temperature sensor may include a subtractor configured to control at least one MOS transistor to keep the reference current constant.

The temperature sensor may include a first voltage source in a first circuit portion having a first value to generate the PTAT current and IPTAT current, and a second voltage source in a second circuit portion having a second value higher than the first value configured to enable a high output voltage to be calibrated. A high voltage current mirror may be disposed between the first voltage source and the second voltage source to support high voltage at the output of the temperature sensor calibration circuit. The high voltage current mirror may be a bipolar transistor pair.

The temperature sensor may include a plurality of bipolar transistor transistors to generate PTAT and IPTAT.

Various embodiments described herein may include a method of calibrating a temperature sensor, including generating a proportional to absolute temperature (PTAT) current, generating an inverse PTAT (IPTAT) current, the PTAT current and IPTAT current being combined to form a reference current having a sensitivity relative to temperature, adjusting the sensitivity and a gain of the high reference current, and setting an output calibration voltage based on the adjusted current slope.

The method may include adjusting the slope using a digital controller.

The digital controller may adjust at least one transistor of a current mirror to vary the slope of the current.

The method may include trimming a variable resistor to set the output calibration voltage of the temperature sensor.

Various embodiments described herein may include a method of calibrating a temperature sensor, including generating a reference current having a sensitivity relative to temperature, adjusting the sensitivity of the reference current using a plurality of current mirrors, passing the adjusted reference current through an output resistor to generate a reference output voltage of the temperature sensor, and adjusting the reference output voltage using a variable resistor.

The method may include adjusting the slope of the reference current using a digital controller.

The method may include trimming the variable resistor using a digital controller. Trimming the variable resistor may compensate for mismatch between the plurality of current mirrors.

The method may include generating the reference current comprises generating a proportional to absolute temperature (PTAT) current and an inverse PTAT current. The method may include using a plurality of bipolar transistor transistors to generate the PTAT and IPTAT current.

The method may include using a subtractor configured to control at least one MOS transistor to keep the reference current constant

DETAILED DESCRIPTION

Figure 1:
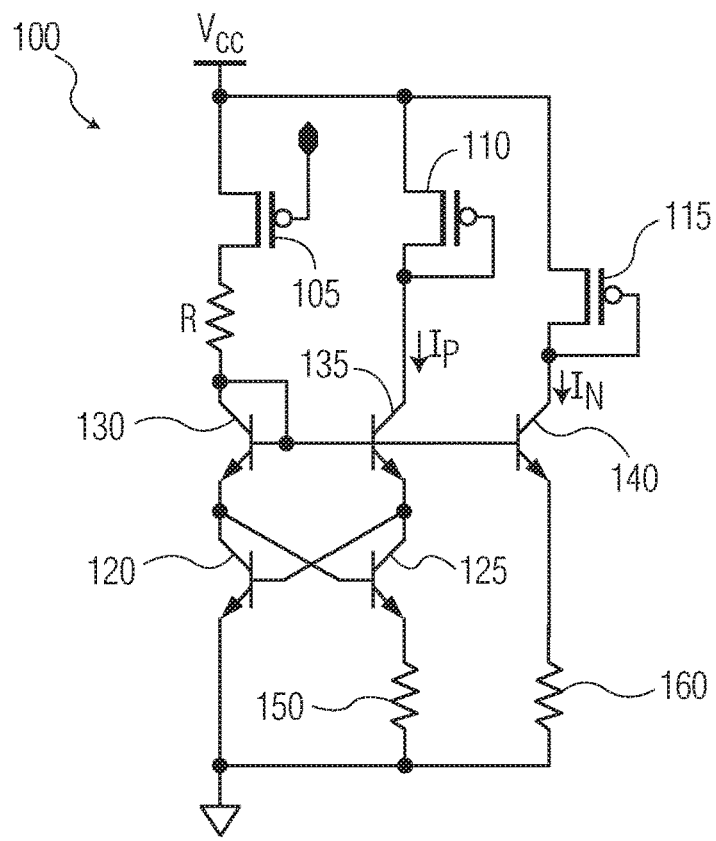
FIG. 1 illustrates a schematic of a PTAT and IPTAT reference current generator in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Temperature sensors are well known in the integrated circuit art. A temperature sensor provides an output voltage whose magnitude equates to the temperature that the circuit senses. The sensed voltage may be compared with a reference voltage to determine whether circuit components are getting too warm, and whether those components should be shut off or bypassed to prevent damage, and so that temperature dependencies of related devices may be compensated for.

One goal of present embodiments is to obtain very good accuracy of a temperature sensor having a high and adjustable current slope to provide an easy temperature sensor calibration. Specifically, embodiments of the present disclosure are able to obtain accuracy within +/−two degrees of a desired temperature range. Embodiments described herein may use a single insertion point for sensor calibration. In the prior art, several temperature insertion points are used to input temperature values and calibrate a desired output temperature. In embodiments described herein, the single insertion point permits greater accuracy and linearizes an output transfer function, or slope, of a given circuit. This linearity provides greater predictability and design flexibility for applications using the sensor to monitor temperature and adjust a desired dynamic range voltage of a sensor.

Embodiments described herein are of a simpler design than prior art solutions that use operational amplifiers and a large number of diodes that increase the complexity of a calibration algorithm used to set a desired temperature. Designs of present embodiments can be used for next generation radar applications using an ADPLL to accurately compensate the TDC and DCO circuits and reduce parameter drifts due to temperature variations.

Transistors are well suited to use as temperature sensors, especially when low cost, high accuracy, good long-term stability and high sensitivity are required. The favorable properties of transistors for this purpose are due to the highly predictable and time-independent way in which the base-emitter voltage is related to the temperature.

When the transistor's temperature changes, its base-emitter diode characteristics change, resulting in different amounts of base current for the same input voltage. This in turn alters the controlled current through the collector terminal, thus affecting output voltage.

FIG. 1 illustrates a schematic of a PTAT and IPTAT reference current generator circuit 100 in accordance with embodiments described herein. The circuit illustrated in FIG. 1 uses currents based on $\Delta VBE/R$, or VPTAT/R to generate a PTAT current $I_P$ and an inverse (IPTAT) current $I_N$ that form a reference current $I_{REF}$ (illustrated in FIG. 3). At an output of the temperature sensor, $I_{REF}$ is compensated using a trim resistor to cancel the impact of process variation and mismatch within components of the circuit, such as current mirrors.

Referring to FIG. 1, using a plurality of MOSET devices 105, 110 and 115, current $I_P$ is generated through resistor R1 150 using voltage output from bipolar transistors 120, 125, 130 and 135. Current $I_N$ is generated through resistor R2 160 using voltage output from bipolar transistors 120, 135 and 140.

$I_P$ and $I_N$ are resultant currents generated from initial temperature sensing. These two currents are combined to generate a reference current $I_{REF}$ (illustrated in FIG. 3) having a very high slope as a starting point to calibrate a temperature sensor. $I_{REF}$ may be represented $I_{REF}=A*I_P-B*I_N$, where A is a first multiplier, and B is a second multiplier.

To produce the currents $I_P$ and $I_N$, the following formulas are used. $I_P$ is a PTAT current that is proportional to absolute temperature and is derived from the equation $I_P=\Delta Vbe(a)/R1$, where $\Delta Vbe(a)=Vbe1+Vbe4-Vbe3-Vbe2$. The inverse PTAT current $I_N$ is derived from the equation $I_N=Vbe(b)/R2$, where $Vbe(b)=Vbe1+Vbe4-Vbe5$. Vbe1 is the voltage of a base-emitter junction of transistor 120. Vbe2 is the voltage of a base-emitter junction of transistor 125. Vbe3 is the voltage of a base-emitter junction of transistor 130. Vbe4 is the voltage of a base-emitter junction of transistor 135. Vbe5 is the voltage of a base-emitter junction of transistor 140.

Figure 3:
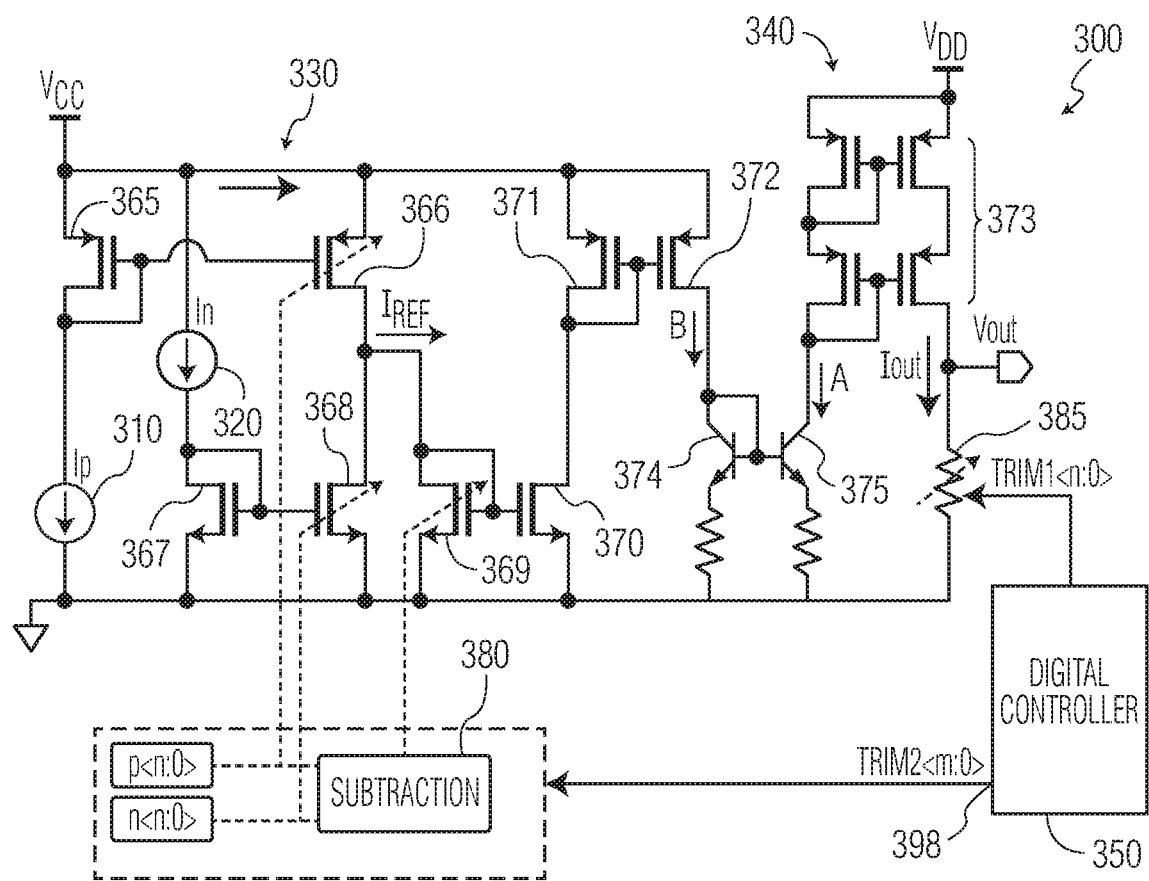
FIG. 3 illustrates a design for a temperature sensor calibration circuit in accordance with embodiments described herein.

The circuit of FIG. 1 may be referred to as a PTAT reference current generator 100 in which PTAT current $I_P$ and inverse PTAT current $I_N$ are combined to form a reference current $I_{REF}$ illustrated in FIG. 3.

Figure 2:
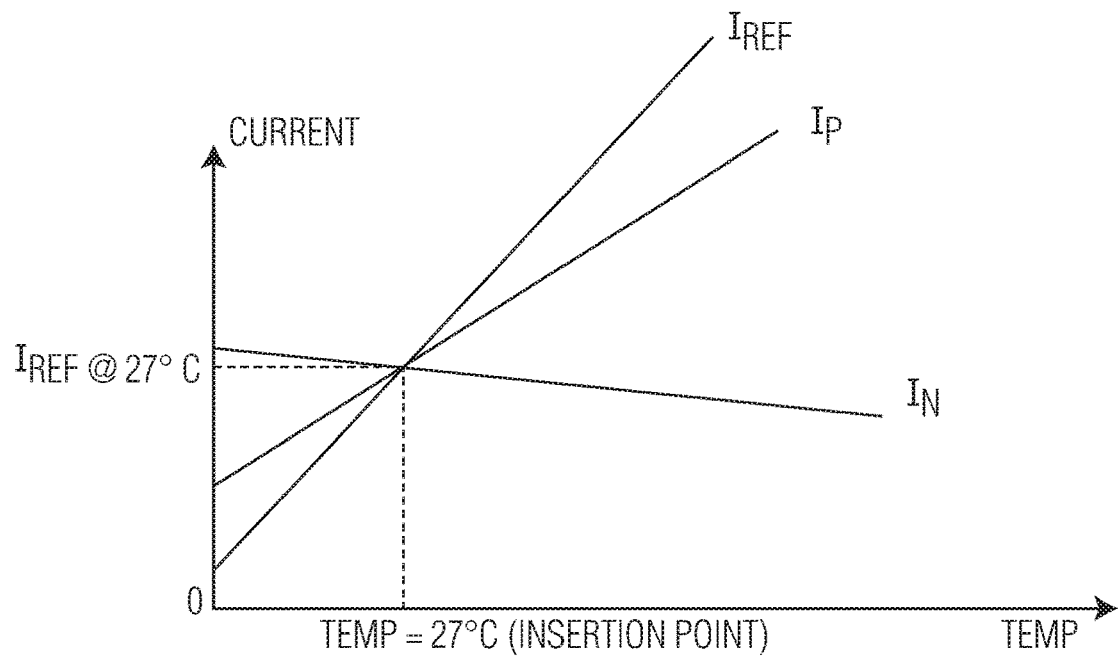
FIG. 2 illustrates a graph of linear characteristics and the relationships of currents in accordance with embodiments described herein.

FIG. 2 illustrates a graph of linear characteristics and the relationships $I_P$, $I_N$, and $I_{REF}$. As illustrated in FIG. 2, $I_P$ and $I_N$ are combined to generate a reference current ($I_{REF}$) having a high slope. The high current slope is generated by combining the positive temperature coefficient factor (TCF) of the PTAT current $I_P$ and the negative coefficient factor (TCF) of the inverse PTAT current $I_N$. The temperature coefficient factor (TCF) of the generated current $I_{REF}$ is defined through the following equation $TCF(I_{REF})=\{TCF(I_P)-\alpha*TCF(I_N)\}/(1-\alpha)$ where $\alpha$ is the ratio B/A (portion of the current $I_N$ divided by the portion of the current $I_P$). The high current slope is later mirrored, or copied at various multiplier or divider current mirrors to generate a current $I_{OUT}$ across resistor $R_{OUT}$ 385 (illustrated in FIG. 3) to produce a desired calibration voltage $V_{OUT}$ which is proportional to the absolute temperature (PTAT). In embodiments described herein, a high slope may refer to high sensitivity relative to temperature, in which a small variation of the temperature generates high variation of the current, for example a TCF of 11000 ppm/° C. Thus a large change in current may reflect a small change in temperature.

Thus the PTAT reference current generator 100 may generate an $I_N$ current and an $I_P$ current that are approximately linear with respect to temperature. The PTAT reference current generator 100 may also permit determination of the slope of the approximately linear $I_{REF}$ current with respect to temperature as illustrated in FIG. 2.

The PTAT reference current generator 100 of FIG. 1 is embodied in FIG. 3 as the pair of PTAT current generators 310 and 320. These current generators are configured to produce currents $I_P$ and $I_N$ that are proportional to the operating temperature of the circuit, and ultimately to the temperature of the temperature sensor that they are used in.

FIG. 3 illustrates a design for a temperature sensor calibration circuit 300 in accordance with embodiments described herein. The design of the circuit is not limited to this configuration as several designs may implement the principles discussed herein.

The temperature sensor calibration circuit 300 includes three portions 330, 340, and 350. Portion 330 relates to current generation and slope generation. Portion 330 may be used to generate $I_P$ and $I_N$ to establish reference currents for the temperature sensor calibration circuit 300. Embodiments described herein use current generation and characteristics thereof to set an adjustable current slope to calibrate the sensor and set a desired output voltage. Using $I_P$ and $I_N$, the initial reference current $I_{REF}$ may be generated that has a desired slope based on a current ratio when a circuit is being calibrated. This current slope is used as a reference to determine a desired output voltage range and sensitivity of the temperature sensor.

In present embodiments, $I_P$ and $I_N$ are combined to generate a reference current with a high slope. The absolute current reference may be altered by adjusting the gain of several circuit components including transistors of current mirrors 365/366, 367/368, 369/370 using a subtraction circuit 380. These may be used in combination with other current mirrors 371/372, Wilson current mirror 373, and bipolar mirror 374/375 to generate the required output voltage at a given temperature (for example 27° C.) which is monitored to calibrate the temperature sensor. The gain may be adjusted or modified by setting ratio on dimensions (for example width) of the various MOS transistors as illustrated in FIG. 3. A structure based on current mirrors is used to change the high slope current $I_{REF}$ to an output current $I_{OUT}$ through output resistor $R_{OUT}$ 385.

A current mirror is a circuit designed to copy a current through one active device by controlling the current in another active device of a circuit, keeping the output current constant regardless of loading. A current mirror has an input and an output. It is used to copy a reference current. In this specific embodiment the plurality of current mirrors are used to copy the generated current $I_{REF}$ to the output.

Various current mirrors may mirror an equal level of current to another branch of a circuit, may act as current dividers, or may act as current multiplier. Once the required ratios are set in the various current mirror transistors 365/366, 367/368, 369/370, they may be used in conjunction with other mirroring transistors 371/372, 373, and 374/375, to generate the PTAT current $I_{OUT}$ at the output. The current mirror 369 is controlled by the digital controller 350 through a subtractor 380 to keep the current reference $I_{REF}$ constant when a trimming is applied to adjust the current slope.

Current may be manipulated in various branches of the temperature sensor calibration circuit 300 depending on a desired output voltage to be sensed during the calibration at at temperature insertion point. If the digital controller 350 instructs $I_{OUT}$ to be increased, current through different branches can be manipulated by the one or more current mirrors. For example, current through branch A could be doubled using current mirror 374/375 be output through branch B. Other ratios may be set. Using this aspect of current mirrors, gain can be set easily.

Adjusting the voltage Vout is done by trimming output resistor 385 to achieve the expected output voltage. Controlling is performed digitally by digital controller 350. Thus the controller 350 may programmably select and controls one or more of the current mirror transistors 366, 368, or 369 via one or more calibration select pins 398 to obtain the desired current $I_{OUT}$ having a desired current slope. In a described embodiment, the current mirrors are implemented using NMOS and NPN transistors. However, those skilled in the art will recognize that the use of PMOS and PNP transistors are possible which result in substantially the same result.

Embodiments described herein include a temperature sensor based on accurate current slope generation. As is known in the art, voltage at a point in a circuit can be measured by passing a current through a resistor. Likewise, to control the voltage level $V_{OUT}$, the current $I_{OUT}$ through the variable resistor $R_{OUT}$ 385 can be adjusted or trimmed to achieve a desired voltage. By using the design described herein using the trimming ability, parametric and circuit degradation may be avoided.

Trimming of the output resistor $R_{OUT}$ 385 may be performed to compensate for any mismatch along the current mirrors. Controller 350 is used to control the trimming, the slope, and thus the calibration.

Portion 340 illustrates an embodiment of the temperature sensor calibration circuit 300. In order to sense high voltages using the temperature sensor 100, a separate voltage source $V_{DD}$ could be used, which is higher than the $V_{CC}$ of the circuit portion 110, permitting a higher voltage at $V_{OUT}$. In such a configuration, $I_{REF}$ is delivered to a current mirror 373, and the circuit portion 340 could use the different supply line $V_{DD}$ to generate an expected output voltage which is proportional to the absolute Temperature. The output resistor 385 is trimmable to compensate the mismatch accumulated along the different current mirrors. Current mirror 373 may use a configuration such as a Wilson current mirror to handle the higher voltage levels.

In portion 340, circuit flexibility is obtained for environments where high temperatures may be sensed. Instead of having $V_{CC}$ and $V_{DD}$ be equal, $V_{DD}$ can be higher than $V_{CC}$ so that higher desired temperatures may be accounted for. In an additional embodiment (not illustrated) circuit portions 330 and 340 are both powered by a same voltage $V_{CC}$. With $V_{CC}$ equal to $V_{DD}$, output voltage $V_{OUT}$ will be lower. Having separate circuits and a $V_{DD}$ greater than $V_{CC}$, over-saturation between circuits may be avoided.

During a calibration, temperature sensor calibration circuit 300 may be set to a temperature, which is a defined temperature value for a given circuit or circuit component. Setting the defined temperature value, an absolute voltage of the temperature sensor output can be obtained which is adjusted to get the expected output voltage $V_{OUT}$.

To achieve these goals, an accurate and high slope generation current is controlled using the digital controller 350.

The current $I_{REF}$ is mirrored to pass through $R_{OUT}$ as $I_{OUT}$ to create $V_{OUT}$ based on a desired output voltage, and thus $V_{OUT}$ is also PTAT.

Between circuit portions 330 and 340 bipolar transistor pair is used in a current mirror configuration. Bipolar transistor pair 375 is used to be safe in a disable mode configuration which is used to power down the circuit. The circuit is either ON (Power ON) or OFF (Power OFF). Unused functions in a circuit can be disabled to save battery for example in wireless application. This configuration has to be managed to get devices in a safe operating area. In portion 340, the supply voltage can go up to 5V. In disable mode, the collector of the bipolar transistor 375 is tied to 5V. High voltage bipolar transistor current mirror 375 can sustain this high voltage to support higher voltages at the output of the temperature sensor calibration circuit 300 which is not the case in a MOS device configuration.

Digital controller 350 may be used to generate a controllable current slope. Programmability from digital controller 350 may be implemented to adjust the output dynamic range of $V_{OUT}$ that corresponds to a corresponding temperature range.

The controller 350 allows flexibility by the controlling the temperature sensitivity. Controlled by digital controller 350, there is a single insertion point in the circuit to calibrate the temperature sensor by adjusting the variable resistor 385.

Digital controller 350 uses logic cells to weight the current mirrors which results in flexibility of the current slope generation. The current mirror may be programmed to weigh $I_P$ and $I_N$ to generate the desired high slope. To keep the output current constant, controller elements such as a subtractor 380 are used to control the multipliers A and B to set the reference current $I_{REF}$. The bits p<n:0> 382 and m<n:0> 384 are binary controlling bits from the digital controller 350 which are decoded through a binary to thermometer decoder to enable control of the current slope through current mirrors 365/366, 367/368 and 369/370. The decoded p<n:0> controls the current source mirror pair 365/366 to determine what multiple of current $I_P$ through transistor 365 will be generated through transistor 366. Similarly, the decoded m<n:0> controls the current source mirror pair 367/368 to determine what multiple of current $I_N$ through transistor 367 will be generated through transistor 368. The decoded difference p<n:0>, m<n:0> drives the last sink current mirror transistor 369 to keep the output current constant.

The calibration technique described herein may minimize manufacturing costs of the temperature sensing device because changing die temperatures of devices for calibration generally takes a longer period test time which leads to higher cost of devices.

Now embodiments of a method of calibrating the temperature sensor will be described. Temperature sensing is based on current generation. $I_P$ and $I_N$ are combined to generate a high slope current $I_{REF}$ using slope generation.

Figure 4:
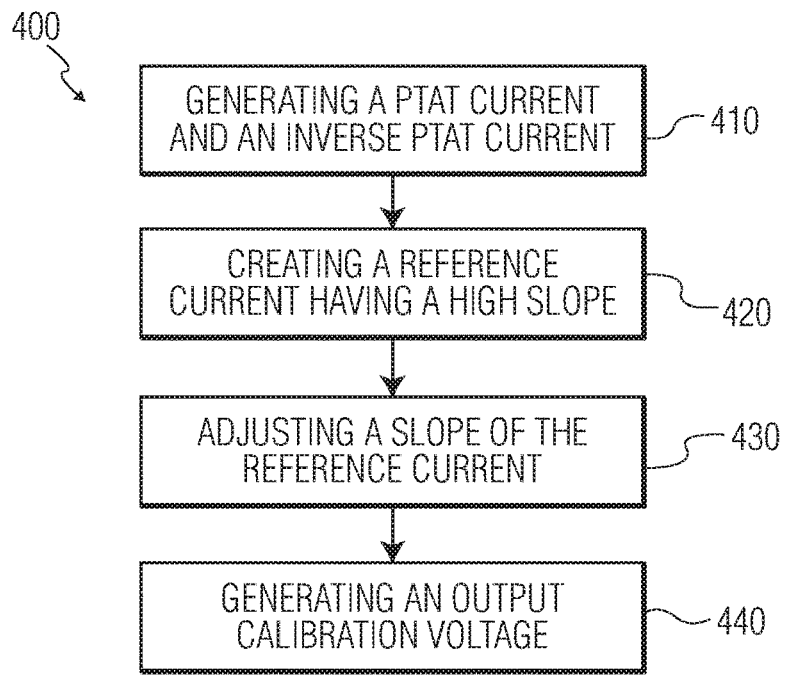
FIG. 4 illustrates a flowchart illustrating a method 400 of calibrating a temperature sensor in accordance with embodiments described herein.

FIG. 4 illustrates a flowchart illustrating a method 400 of calibrating a temperature sensor in accordance with embodiments described herein. Method 400 may be used to calibrate a temperature sensor such as temperature sensor calibration circuit 300 having portions 100 and 330-350 of FIGS. 1 and 3. Thus, the components used in method 400 may include components similar to or identical to those of temperature sensor having portions 100 and 330-350 of FIGS. 1 and 3.

In FIG. 4, method 400 may start at step 410, which may include generating a PTAT current and an inverse PTAT current. Step 420 may include combining PTAT and IPTAT into a reference current $I_{REF}$ having a high current slope. Step 430 may include adjusting a slope of the reference current $I_{REF}$ using a plurality of current mirrors. Step 440 may include generating an output calibration voltage including delivering the high slope current to the output resistor, wherein the output resistor is trimmable to tune the output calibration voltage to correspond to a defined insertion temperature value. The activity of calibrating to a desired voltage based on an defined temperature may also include obtaining a number of temperature readings based on the voltage at the output resistor 385 and trimming the temperature sensor to result in the temperature sensor providing a temperature reading with a value equal or closest to the value of the calibration temperature during the calibration. Method 400 may include other activities similar to or identical to the activities of temperature sensor 100 and 330-350 of FIGS. 1 and 3.

Figure 5:
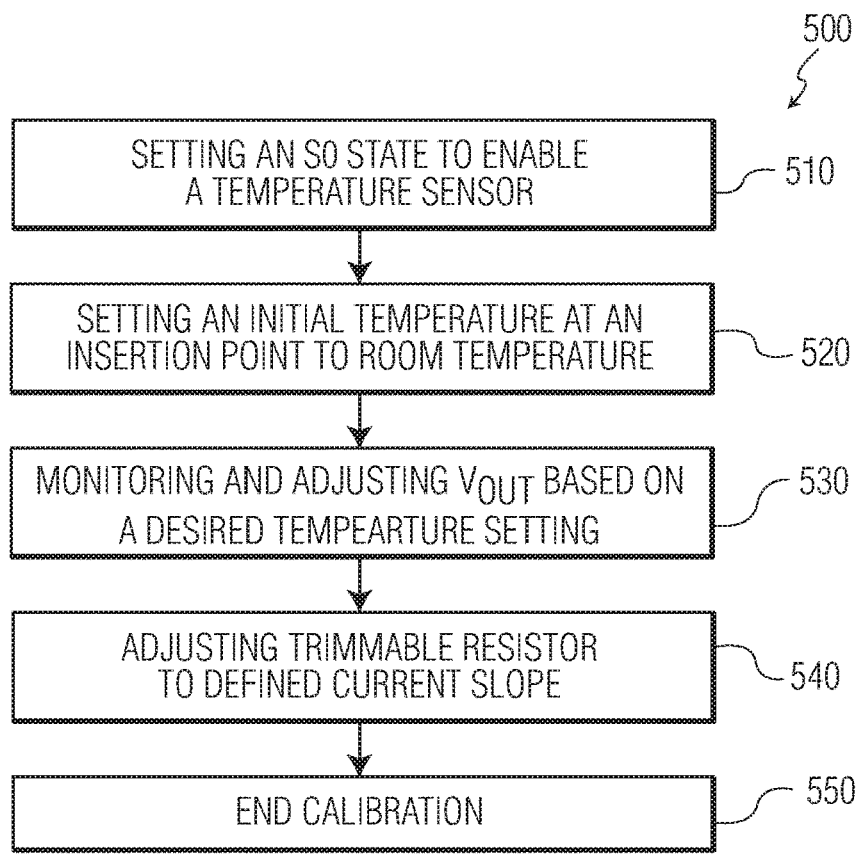
FIG. 5 illustrates a flowchart of steps that may be performed by a digital controller in accordance with embodiments described herein.

FIG. 5 illustrates a flowchart of steps that may be performed by the digital controller 350 in accordance with embodiments described herein. Step 510 may include setting an initialization state to enable the temperature sensor. A temperature sensor ("TS") enable signal may be used, for example, in the digital controller to effectuate this change. Step 520 may include setting an initial temperature at an insertion point to be a room temperature value, on the order of 25 degrees Celsius. Step 530 may include monitoring and adjusting $V_{OUT}$ based on a defined temperature setting of the system. Step 540 may include adjusting the trimmable resistor 385 to get the desired output voltage. At step 550, the temperature sensor calibration is done.

The temperature sensor calibration circuit 300 may provide accurate temperature measurements by measuring the temperature of a silicon substrate, and may produce a linear voltage proportional to the sensed die temperature. The output current $I_{REF}$ generated by the PTAT circuit 100 of FIG. 1 is used once the slope is defined by using the current proportional to the absolute temperature $I_P$ and the current inversely proportional to the temperature In. The output $V_{OUT}$ of the sensing device 300 is designed to vary in a linear manner as a function of temperature.

Transistor pairs are each configured as current mirrors 365/366, 367/368, 369/370, 371/372, Wilson current mirror 373, and 374/375 that take up a percentage of the PTAT circuit current $I_{REF}$ and apply it to output circuit through resistor $R_{OUT}$. Because of the mismatch in the current mirrors, the calibration is performed at the sensor output.

For the application of the sensed circuit, a final calibration of the PTAT output may be made at the packaging site or at wafer level. By using the design described herein using the trimming ability, parametric and circuit degradation may be avoided.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware including several distinct elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A temperature sensor, comprising:
a first current generator first voltage source in a first circuit portion having a first value configured to generate a proportional to absolute temperature (PTAT) current;
a second current generator configured to generate an inversely proportional to absolute temperature (IPTAT) current, the PTAT current and IPTAT current being combined to form a reference current having a sensitivity relative to temperature;
a first voltage source in a first circuit portion having a first value to generate the PTAT current and IPTAT current;
a second voltage source in a second circuit portion having a second value higher than the first value configured to calibrate a high output voltage;
a plurality of current mirrors comprising one or more first current mirrors configured to adjust the sensitivity of the reference current and one or more second current mirrors connected to receive the reference current and to produce a generated current; and
a variable resistor configured to generate an output voltage based on the generated current, the output voltage having a magnitude that corresponds to a temperature value.

2. The temperature sensor of claim 1, further comprising a digital controller configured to control adjustment of the sensitivity of the reference current by further being configured to control a gain setting of each of the plurality of current mirrors.

3. The temperature sensor of claim 2, wherein the variable resistor is controlled by the digital controller.

4. The temperature sensor of claim 2, wherein the plurality of current mirrors include a plurality of MOS transistors.

5. The temperature sensor of claim 4, further comprising a subtractor configured to control at least one MOS transistor to keep the sensitivity of the reference current constant.

6. The temperature sensor of claim 1, further comprising a high voltage current mirror disposed between the first voltage source and the second voltage source to support high voltage at the output of the temperature sensor.

7. The temperature sensor of claim 6, wherein the high voltage current mirror is a bipolar transistor pair.

8. The temperature sensor of claim 1, comprising a plurality of bipolar transistors to generate the PTAT and IPTAT currents.

9. A method of calibrating a temperature sensor, comprising:
generating a proportional to absolute temperature (PTAT) current using a first current generator of the temperature sensor which is connected to a first voltage source in a first circuit portion having a first value to generate the PTAT current;
generating an inversely proportional to absolute temperature (IPTAT) current using a second current generator of the temperature sensor which is connected to the first voltage source in a first circuit portion having a first value to generate the PTAT current, the PTAT current and IPTAT current being combined to form a reference current having a sensitivity relative to temperature;
adjusting the sensitivity of the reference current to produce an adjusted current; and
generating an output voltage based on the adjusted current using a second voltage source in a second circuit portion having a second value higher than the first value configured, the output voltage having a magnitude that corresponds to a temperature value.

10. The method of claim 9, wherein the adjusting the sensitivity uses a digital controller.

11. The method of claim 10, wherein the digital controller adjusts at least one transistor of a current mirror to adjust a gain setting of the current mirror to vary the sensitivity of the reference current.

12. The method of claim 10, further comprising:
exposing the temperature sensor to a predetermined temperature, and
trimming a variable resistor to set the output voltage of the temperature sensor to a calibrated output voltage, wherein the calibrated output voltage corresponds to the predetermined temperature.

13. A temperature sensor, comprising:
a first current generator configured to generate a proportional to absolute temperature (PTAT) current;
a second current generator configured to generate an inversely proportional to absolute temperature (IPTAT) current, the PTAT current and IPTAT current being combined to form a reference current having a sensitivity relative to temperature;
a plurality of current mirrors configured to adjust the sensitivity of the reference current to produce a generated current;
a first voltage source in a first circuit portion having a first value to generate the PTAT current and IPTAT current;
a second voltage source in a second circuit portion having a second value higher than the first value configured to calibrate an output voltage; and
a variable resistor configured to generate the output voltage based on the generated current, the output voltage having a magnitude that corresponds to a temperature value.

14. The temperature sensor of claim 13, further comprising a high voltage current mirror disposed between the first voltage source and the second voltage source to support high voltage at the output of the temperature sensor.

15. The temperature sensor of claim 14, wherein the high voltage current mirror is a bipolar transistor pair.

* * * * *